Patented Sept. 30, 1952

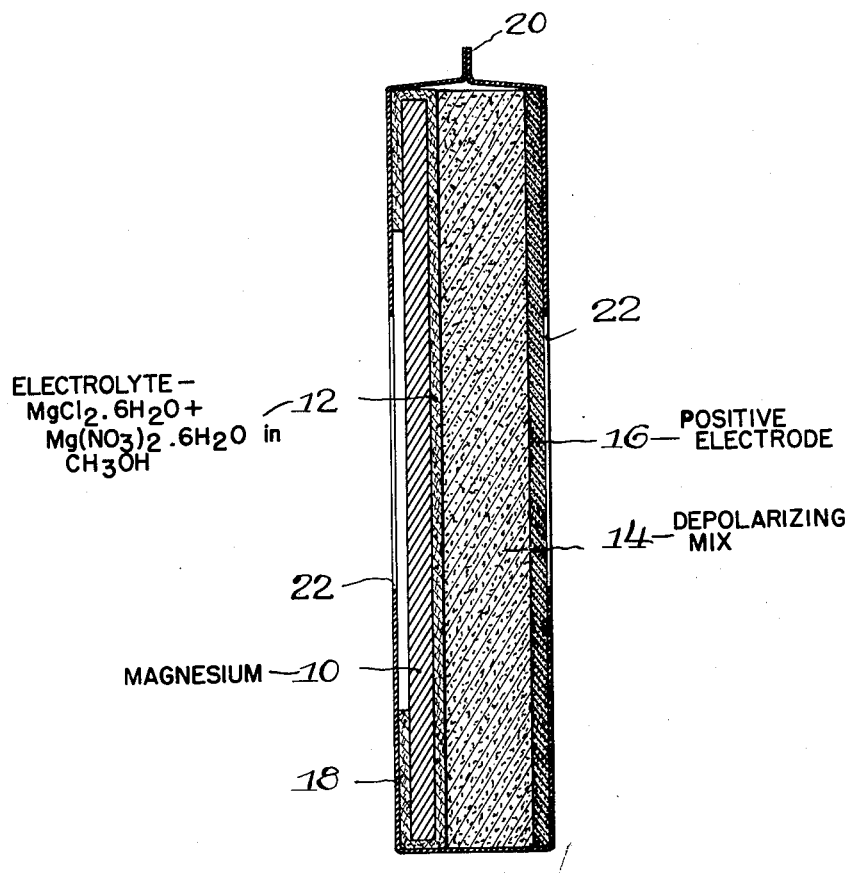

2,612,534

UNITED STATES PATENT OFFICE 2,612,534

PRIMARY CELL

Ivan C. Blake, Freeport, Ill., assignor to Burgess Battery Company, Freeport, Ill., a corporation of Delaware Application April 24, 1951, Serial No. 222,707

4 Claims. (Cl. 136—100)

This invention relates to improvements in current producing primary cells and particularly to that type of primary battery cell employing magnesium as the negative electrode.

The use of magnesium as the negative electrode of current-producing primary cells is attractive because of the greater electrolytic activity of magnesium in comparison to that of the commonly used metal zinc, and the resulting higher voltage and greater energy delivering powers of the cells employing magnesium. However, magnesium is also much more susceptible than zinc to spontaneous corrosion and its use in primary cells has for this reason been very severely limited because satisfactory shelf life is not obtained.

In the copending application of Joseph J. Coleman and Demetrios V. Louzos, Serial No. 61,244, filed November 20, 1948, a primary cell is disclosed having magnesium as the negative electrode and an electrolyte in which the solvent component is methanol and the solute component is from the group consisting of the chlorides, nitrates and perchlorates of magnesium and the metals electronegative to magnesium. Such a cell possesses substantial current-delivering properties and shelf life.

In accordance with the present invention, it has been discovered that the use of a mixture of magnesium chloride and magnesium nitrate in the solute component of the electrolyte of a cell of the character described in the mentioned application results in unexpectedly greater current-delivering power than the use of either magnesium chloride or magnesium nitrate alone, and that the resulting cell possesses substantial shelf life. In accordance with the present invention, water may be included with methanol in the electrolyte solvent.

It is, accordingly, the principal object of the invention to provide a primary cell with a magnesium negative electrode having strong current-delivering properties and substantial shelf life in which the electrolyte has a solute component composed of a mixture of magnesium chloride and magnesium nitrate and a solvent component of methanol or a mixture of methanol and water.

Magnesium chloride and magnesium nitrate normally occur in the form of the hexahydrates, $MgCl_2.6H_2O$ and $Mg(NO_3)_2.6H_2O$, and they will for convenience herein be called simply the chloride and nitrate, respectively.

The single figure of the drawing is a sectional elevation of a cell of the present invention.

The physical embodiment shown and described herein is illustrative only and the invention is not limited to any particular physical arrangement but may be incorporated in any primary cell structure as may be desired. The single cell illustrated is of flat wafer shape and is especially adapted for use in a multiple cell battery. The cell is made up of juxtaposed flat elements consisting of, in the order named, the negative electrode 10, the bibulous separating member 12, the depolarizing mix 14 and the positive electrode 16. The bibulous separator 12, in addition to covering the surface of the negative electrode 10 facing the mix 14, preferably covers the edges of the electrode 10 and the marginal portions of the opposite surface thereof. The separator 12 and the mix 14 are liquid absorbent and are moistened with the liquid electrolyte which will be described in detail hereinafter. The said elements are enclosed in an envelope 18 of a non-conductive, liquid-impervious, electrolyte-resistant sheet material, which may be a flexible film of rubber hydrochloride, the copolymer of vinyl chloride and vinyl acetate, a polymer of ethylene or the like. The envelope may be formed in any suitable manner and that shown in the drawing is formed by placing one edge of the assembled elements against the median portion of a strip of the sheet material and folding the latter so that the portions thereof on opposite sides of the fold cover the opposite broad surfaces of the assembled elements and extend beyond the edges thereof. The extending portions are then joined together by an adhesive or by heat-sealing to form the joint indicated at 20. Openings or windows 22 of substantial size are provided in the broad portions of the envelope 18 which overlie the electrodes 10 and 16 respectively. Said openings are in alignment with each other and a number of the cells are adapted to be stacked together in pressure engagement to form a battery with the negative electrode 10 of one cell suitably connected to the positive electrode 16 of the adjacent cell through the windows 22.

As stated heretofore, the negative electrode 10 is composed of magnesium. The separating member 12 may be composed of a suitable bibulous material, such as porous paper or pulp. The mix 14 may be composed of a mixture of a suitable oxidizing agent and a conductive agent, such as graphite or other finely divided carbon. Examples of suitable oxidizing agents are manganese dioxide, lead dioxide, cupric oxide, silver chloride, the persulfates of sodium and potassium, or the like. A mixture of powdered manganese dioxide and thermal acetylene black has been found to be very satisfactory. Silver chloride is itself conductive and where it is used a separate conductive agent is not required. The positive electrode 16 may be a flexible sheet, the conductive factor of which is carbon. Such conductive sheet material is well known and may be composed of carbon particles cemented together by a binder, and the composition may, if desired, be reenforced by a porous fabric sheet, such as cotton, rayon, etc.

As stated heretofore, the solvent component of the electrolyte is methanol or a mixture of methanol and water, and the solute component is a mixture of magnesium chloride and magnesium nitrate. The proportions of the solute mixture may be varied, and from about 40% to 80% by weight of magnesium chloride, the remainder being magnesium nitrate, has been found to give satisfactory improved capacity, and the preferred proportions are about 40% to 60% by weight of magnesium chloride. A mixture of substantially equal parts of the said two compounds provides very superior results. The compounds mentioned are soluble in methanol and mixtures of methanol and water, and form therewith an electrolytically active and conductive solution.

A specific example of a cell of the invention is one having the physical structure described heretofore, a negative electrode of magnesium, a depolarizing mix composed of a mixture of powdered manganese dioxide and thermal acetylene black, and an electrolyte in which the solvent and solute components are present in substantially equal parts by weight and the solvent component is methanol and the solute component is a mixture of equal parts of magnesium chloride and magnesium nitrate. The initial open circuit voltage of such a cell is about 2.4 volts.

To show the benefits which are obtained from the invention, tests were made upon batteries each made up of ten series-connected cells of the construction given in the foregoing example with the exception that the proportions of magnesium chloride in the solute mixture were varied from 100% to 0% by weight, the remainder being magnesium nitrate. Each battery was connected continuously to a load circuit having a resistance of 15,000 ohms. One group of the batteries was subjected to discharge when they were fresh, that is within 48 hours after they had been made, and a second similar group was held in storage for 6½ months and was then placed on discharge. The number of hours of continuous service which each battery had delivered was noted when the closed circuit voltage of the battery had dropped to 15 volts or 1.5 volts per cell, which was considered to be a reasonable end point. The table hereinafter shows the results of the tests. Each value given is the average of the results for a number of similar batteries.

*Table 1*

| Electrolyte Solute Composition in Percent by Weight | | Capacity in Hours Service to 1.5 Volts Per Cell End Point | |
|---|---|---|---|
| $MgCl_2.6H_2O$ | $Mg(NO_3)_2.6H_2O$ | Fresh | After 6½ months |
| 100 | 0 | 164 | 11 |
| 80 | 20 | 157 | 94 |
| 70 | 30 | 155 | 91 |
| 60 | 40 | 195 | 113 |
| 50 | 50 | 197 | 192 |
| 40 | 60 | 200 | 137 |
| 30 | 70 | 136 | 57 |
| 0 | 100 | 8 | 0 |

The data given in the above table show that the use of a mixture containing about 40% to 80% of magnesium chloride provides a definite advantage over the use of either magnesium chloride or magnesium nitrate alone. The data also show that the optimum proportions are about 40% to 60% of magnesium chloride. They show the surprising phenomenon that greater capacity is obtained with a mixture of the compounds over that obtained with either compound alone.

As stated heretofore, instead of using methanol alone as the solvent, a mixture of water and methanol may be used and an advantage is obtained in such case also from the use of a mixture of magnesium chloride and magnesium nitrate. In such cells in which water is present in the electrolyte, there is included a compound from the group consisting of chromium trioxide and the salts of chromic acid which possess at least a slight degree of solubility in water, that is, varying from sparingly soluble to extremely soluble. Such compound assists the methanol in inhibiting spontaneous corrosion of the magnesium. Examples of compounds which may be used are chromium trioxide, the chromates of ammonium, barium, calcium, lithium, potassium, sodium, and strontium, and the dichromates of ammonium, barium, lithium, potassium and sodium. Compounds having a solubility as low as .00034 gram per 100 grams of water are suitable, barium chromate being an example of such a compound. Chromium trioxide and the chromate and dichromate of sodium have been used with excellent results. As is well known, chromium trioxide is the anhydride of chromic acid, and in the electrolyte it exists in solution in the water as chromic acid. Any one or a mixture of the compounds described may be used. For convenience, such inhibiting compound will hereinbe called the chromium compound.

The chromium compound may be incorporated in the cell in any desired manner, as by introducing it directly into the electrolyte, or incorporating it in the separating member 12 or the depolarizing mix 14. The manner in which the inhibiting function is accomplished is not understood, but it is believed to be by the chromium compound being present at the surface of the negative electrode 10 which is exposed to the electrolyte. Since the chromium compound is soluble to at least a slight degree in the water of the electrolyte solvent, and the separating member 12 and depolarizing mix 14 are moistened with the electrolyte, if the chromium compound is incorporated in these elements it is subsequently dissolved in the electrolyte and becomes available at the surface of the negative electrode. It is, therefore, only required that the chromium compound be accessible to the electrolyte, that is, that the compound be disposed in access relation with the electrolyte. The electrolyte, in turn, is in contact with the negative electrode.

The amount of chromium compound which may be used is not critical. Only a small amount is required, and an excessive amount should be avoided since this results in a waste of the compound and may interfere with the proper operation of the cell. Amounts of chromium compound which have been used with success are about .01% to 5.0%, in terms of $CrO_3$ based on the weight of the water in the solvent component, by which is meant the free water and does not include the combined water which may be present, such as the water of hydration of the solute.

A specific example of a cell of the last described character is one similar to the example described heretofore with the difference that the solvent component of the electrolyte is a mixture of equal parts by weight of methanol and water and the electrolyte contains sodium dichromate in the amount of .06% in terms of $CrO_3$ based on the amount of water in the solvent.

To show the benefits obtained from the mixture of magnesium chloride and magnesium nitrate when water is present in the solvent, data are given in Table 2 hereinafter for batteries of a construction similar to that of the foregoing example in which the solvent component of the cells was a mixture of equal parts of water and methanol and the solute component was various mixtures of magnesium chloride and magnesium nitrate, the solute being present in an amount by weight equal to that of the solvent. In these batteries sodium dichromate was incorporated in the electrolyte containing $CrO_3$ in an amount equal to approximately .06% of the weight of the water. The conditions of the tests were similar to those described heretofore. In compiling the data, tests were made on a group of batteries which were fresh and also on a group which had been aged for three months before discharge was commenced. Each value given in the table is the average of the results for a number of similar batteries.

Table 2

| Solute Composition Percent by Weight | | Capacity in Hours Service to 1.5 Volts Per Cell End Point | |
|---|---|---|---|
| $MgCl_2.6H_2O$ | $Mg(NO_3)_2.6H_2O$ | Fresh | After 3 months |
| 100 | 0 | 193 | 107 |
| 75 | 25 | 227 | 157 |
| 50 | 50 | 222 | 179 |
| 25 | 75 | 162 | 105 |
| 0 | 100 | 105 | 45 |

The data show that definitely superior performance is obtained when a mixture of the solute compounds is used containing about 50% to 75% of magnesium chloride, over that obtained when either compound is used alone. Many tests in addition to those listed in Table 2 were made on batteries having various proportions of the solute ingredients and of the solvent ingredients, and an advantage was obtained with the solute mixture when the amount of magnesium chloride varied from about 40% to 80% of the combined weight of the two compounds with methanol alone as the solvent and also when water is present in an amount up to about 70% of the combined weight of the methanol and water. If water is used in an amount greater than 70%, the shelf life of the battery is adversely affected to an undesirable extent. The preferred proportions for the magnesium chloride-magnesium nitrate solute mixture are about 40% to 60% by weight of magnesium chloride.

What is claimed is:

1. In a primary cell having a positive electrode and a magnesium negative electrode, an electrolyte in contact with said electrodes having a solvent component comprising essentially methanol and a solute component comprising essentially a mixture of magnesium chloride and magnesium nitrate.

2. In a primary cell having a positive electrode and a magnesium negative electrode, an electrolyte in contact with said electrodes having a solvent component comprising essentially methanol and a solute component comprising essentially a mixture of magnesium chloride and magnesium nitrate in which the amount of magnesium chloride is about 40% to 80% of the weight of the mixture.

3. In a primary cell having a positive electrode and a magnesium negative electrode, an electrolyte in contact with said electrodes having a solvent component comprising essentially methanol and a solute component comprising essentially a mixture of magnesium chloride and magnesium nitrate in which the amount of magnesium chloride is about 40% to 60% of the weight of the mixture.

4. In a primary cell having a positive electrode and a magnesium negative electrode, an electrolyte in contact with said electrodes having a solvent component comprising essentially a mixture of methanol and water containing up to 70% by weight of water, and a solute component comprising essentially a mixture of magnesium chloride and magnesium nitrate in which the amount of magnesium chloride is about 40% to 80% of the weight of the mixture, and a compound in access relation with said electrolyte from the group consisting of chromic acid and the salts of chromic acid having at least a slight degree of solubility in water, said compound being present in an amount sufficient to inhibit spontaneous corrosion of said magnesium electrode.

IVAN C. BLAKE.

REFERENCES CITED

The following references are of record in the file of this patent:

UNITED STATES PATENTS

| Number | Name | Date |
|---|---|---|
| 2,343,194 | Lawson | Feb. 29, 1944 |
| 2,445,306 | Lawson | July 13, 1948 |
| 2,547,907 | Fry | Apr. 3, 1951 |